April 28, 1959      R. W. FABIAN ET AL      2,884,319
ACICULAR METAL PARTICLES FROM METAL CARBONYLS
AND METHOD OF PREPARATION
Filed Nov. 27, 1956
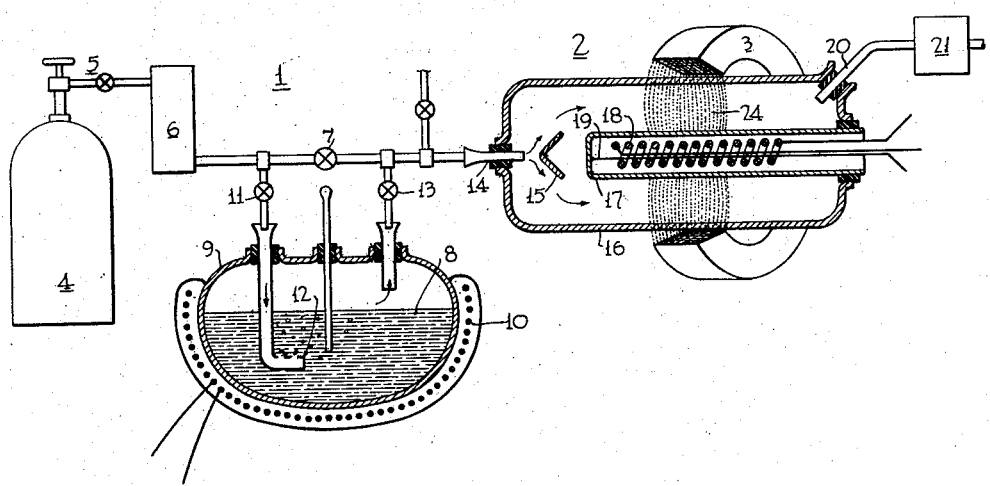
FIG. 1
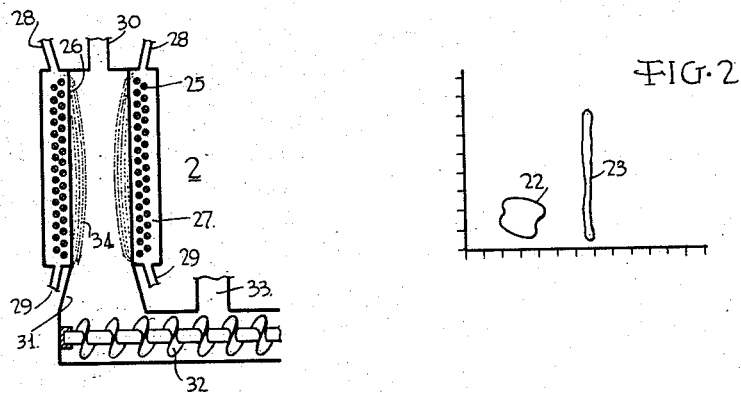
FIG. 2
FIG. 3
INVENTORS.
Robert W. Fabian
John L. Sienczyk
BY
ATTORNEY

United States Patent Office 2,884,319
Patented Apr. 28, 1959

2,884,319
ACICULAR METAL PARTICLES FROM METAL CARBONYLS AND METHOD OF PREPARATION

Robert W. Fabian, Newton, and John L. Sienczyk, Chelsea, Mass., assignors, by mesne assignments, to The Budd Company, a corporation of Pennsylvania Application November 27, 1956, Serial No. 624,611

9 Claims. (Cl. 75—.5)

This invention relates to metal particles obtained by the thermal decomposition of metal carbonyls and more particularly to such particles which have a relatively great length to diameter ratio.

For many purposes there is a present need for acicular, needle-like particles which have attenuated dimensions. As applied to powder metallurgy, such particles would lend themselves to felted aggregations which, upon sintering would have improved tensile properties. For magnetic recording, the acicular configuration is especially desirable since magnetic particles of this shape would act like elemental bar magnets requiring a greater coercive force to change their polarization as compared with the coercivity of the conventional spheroidal particles.

It is well known that very pure metallic particles in the form of powder, scales or grains can be produced by the thermal decomposition of the metal carbonyls such as iron pentacarbonyl, $Fe(CO)_5$, nickel carbonyl $Ni(CO)_4$ and others. For example, when the iron pentacarbonyl vapor in the presence of an inert carrier gas is introduced into a reaction chamber and directed upon heated surfaces maintained at temperatures approximately within the range of 200° C. to 400° C., a very pure form of metallic iron powder is precipitated.

In general, the nature of the decomposition product depends upon the concentration of the carbonyl vapor and upon the temperature at which the reaction is maintained. If the vapor is highly concentrated and rapidly decomposed, nucleation occurs with subsequent aggregation forming minute spheroidal particles. Lower reaction rates result in larger less regular forms for the metal deposit.

Attempts have been made to attain a preferred orientation for the aggregation by varying the decomposition rate and by programming the flow patterns of the carbonyl vapor within the reaction chamber. However, there has not been sufficient control for the production of acicular particles.

Therefore, it is an object of this invention to obtain as an article of manufacture acicular metal particles of attenuated dimensions.

It is a further object to adapt the thermal decomposition of the carbonyls of magnetic metals to the production of acicular metal particles.

Still further objects will appear hereinafter.

Briefly stated, according to one aspect of this invention, acicular metal particles are obtained by the thermal decomposition of a magnetic-metal carbonyl in the presence of a substantial and controlled unidirectional magnetic field.

While the specification concludes with claims, particularly pointing out and distinctly claiming the subject matter of this invention, it is believed a better understanding may be had from the following description taken in conjunction with accompanying drawing in which:

Fig. 1 illustrates an apparatus for obtaining the objects of this invention;

Fig. 2 is a diagrammatic representation of the decomposition products; and

Fig. 3 illustrates an alternative apparatus.

By way of example, the objects of this invention may be implemented by the apparatus of Fig. 1 wherein there is illustrated at 1 a supply means for mixing a carbonyl with an inert carrier gas and for controlling the concentration of the carbonyl in the mixture, at 2 a reaction chamber for the controlled production of acicular metal particles, and at 3 a means for producing a unidirectional magnetic field within the volume of the reaction chamber.

In a preferred embodiment, the carrier gas may comprise argon supplied from a pressure vessel 4 conducted by a pressure control system 5 to a purifying apparatus 6 such as a heated titanium sponge for removal of oxidizing impurities. The carrier gas is then conducted through valve 7 to the reaction chamber 2 for preparatory flushing of the decomposition volume.

Liquid carbonyl 8, iron pentacarbonyl for example, contained in a closed vessel 9 is heated by means of a mantle 10 to temperatures below the decomposition temperature. The carrier gas is conducted through valve 11 to a fritted glass disk 12 and allowed to bubble through the liquid carbonyl. The carrier gas is carburized by the carbonyl by an amount depending upon the equilibrium pressure of the carbonyl vapor in the gas bubbles. Thus the concentration of the carbonyl may be controlled conveniently by adjusting the temperature of the liquid carbonyl.

The gaseous mixture is then conducted through valve 13 to inlet 14 of the reaction chamber 2. Baffle means 15 may be provided to assure thorough mixing and to direct the flow of the gases through the reaction chamber.

The reaction chamber comprises a closed vessel 16 preferably cylindrical and provided with an inner concentric surface 17. A resistance heating element 18 is employed to maintain the surface temperature of the tube 17 at a temperature above the decomposition temperature of the carbonyl. A thermocouple 19 is included as an indicator and may provide feed back information for control of the resistance heater.

In the proximity of the heated surface 17 the carbonyl is decomposed into a very pure form of iron, in the case of iron pentacarbonyl, and gaseous carbon monoxide. The metal appears as a deposit on the tube while carbon monoxide and any remaining carbonyl leave the reaction chamber through outlet 20. A condensation apparatus 21 may be provided for recovery of any excess carbonyl and for control of the carbon monoxide exhaust.

In the absence of a substantial magnetic field within the volume of the reaction chamber the metallic deposits are in the form of more or less spherical particles as illustrated diagrammatically at 22 in Fig. 2. Without a preferred direction for aggregation, the particles grow nearly symmetrically upon nucleation centers and acicular formations do not result.

At 23 is illustrated the unique form of acicular fibers obtained according to this invention. Such fibers are acicular or needle-like in appearance and have a relatively great length to diameter ratio. This aggregate for magnetic materials is due to the preferred orientation prescribed by the local unidirectional magnetic field. The acicular shape results from the growth, upon nucleation, of elemental forms which orient themselves along lines of magnetic flux and which are compacted due to induced magnetization so that there is diffusion among them tending to form crystal patterns which weld the structure into a homogeneous fiber.

With further reference to Fig. 1, the magnetic field may be conveniently produced by a permanent magnet 3 or by an aggregation of permanent magnets aligned radially of the reaction chamber so that lines of magnetic flux 24 of a substantial and controllable density will exist across the reaction zone. Alternatively the permanent magnet may be replaced by a suitable electromagnet which produces a unidirectional magnetic field.

Acicular particles according to this invention have length to diameter ratios approximately in the range of from 10 to 100 and have lengths of from several millimeters down to micron dimensions. The size of the particles is a function of the reaction rate, temperature of the reaction and concentration of the carbonyl vapors, and their length to diameter ratio is a function of the flux density of the magnetic field across the reaction zone.

The process has been carried out successfully with a magnetic field strength of only 5,000 gauss and with the heated surfaces of the reaction chamber cycled through a temperature range of from 210° C. to 238° C. With 99.5% iron pentacarbonyl, at temperatures within the range of 210° C. to 238° C. and purified argon as the carrier gas, acicular formations have been produced at atmospheric pressure.

An additional advantage of this invention is that fibers of ferro-magnetic alloys may be readily obtained. Carbonyls of the several metals which are to comprise the alloy may be mixed, either as liquids before vaporization or in the gaseous state, and then decomposed as above within an oriented magnetic field. For example, particles of alloys such as nickel-steel, Permalloy (78Ni,22Fe), and Perminvar (45Ni25Co,30Fe) may be obtained from mixtures of the carbonyls of iron, nickel, and of cobalt.

Fig. 4 illustrates an alternative form for the reaction chamber. The magnetic field is produced by a direct current solenoidal electromagnet 25 wound about a cylindrical reaction chamber 26. Encircling the reaction chamber is an annular heating chamber 27 through which hot flue gases may be passed to raise the temperature of the reaction chamber surfaces above the decomposition temperature of the carbonyl vapors. Inlet ports 28 and outlet ports 29 are provided for flue gas transport. The carbonyl vapors are introduced through inlet tube 30. An outlet tube 31 communicates with a conveyor system such as the screw conveyor 32 for discharge of the decomposition product. Excess carbonyl and the carbon monoxide produced during the decomposition are exhausted through port 33. In this apparatus, the lines of magnetic flux 34 are parallel to the cylindrical surfaces at which the decomposition is carried out and the decomposition product will comprise acicular particles aligned in this direction.

Removal of the decomposition product is readily accomplished by shutting off the current to the solenoid whereupon the fibers lose their induced magnetism and fall through the exit port 31 to the conveyor 32.

This invention is in no sense limited to the specific uses, products and processes described. By modifications within the spirit and scope of this invention, it is possible to obtain acicular particles of many magnetic materials and of alloys of magnetic and non-magnetic materials which cannot otherwise be obtained in such form, and no limitations are intended other than those imposed by the following claims.

What is claimed is:

1. As an article of manufacture, acicular particles of a magnetic metal obtained by the thermal decomposition of a magnetic-metal carbonyl in the presence of a substantial, controlled, local, unidirectional magnetic field.

2. As an article of manufacture, acicular particles of a magnetic-metal alloy obtained by the thermal decomposition of a mixture of metal carbonyls including at least one magnetic-metal carbonyl in the presence of a substantial, controlled, local, unidirectional magnetic field.

3. The process of forming acicular metal particles which process comprises thermally decomposing a carbonyl compound of a magnetic metal in the presence of a substantial, controlled, local, unidirectional magnetic field to cause aggregation of the decomposition product along lines of magnetic flux.

4. The process of forming acicular metal particles which process comprises thermally decomposing a gaseous mixture containing at least one ferro-magnetic metal carbonyl in the presence of a substantial, controlled, local, unidirectional magnetic field to cause aggregation of the decomposition product along lines of magnetic flux.

5. The process of forming acicular iron particles which process comprises thermally decomposing iron pentacarbonyl in the presence of a substantial, controlled, local, unidirectional magnetic field to cause aggregation of the decomposition product along lines of magnetic flux.

6. The process of forming acicular metal particles which process comprises heating liquid iron pentacarbonyl below its decomposition temperature, carburizing an inert carrier gas by passing the gas through the heated carbonyl, heating the gaseous mixture to a temperature above the decomposition temperature of the carbonyl, decomposing the carbonyl, and applying simultaneously with the decomposing of the carbonyl a substantial, controlled, local, unidirectional magnetic field to the gaseous mixture to cause aggregation of the decomposition product along lines of magnetic flux.

7. The process of forming magnetic-metal particles having a desired length to diameter ratio which process comprises the simultaneous steps of producing within a reaction zone a substantial and controllable magnetic field having a strength proportional to the desired length to diameter ratio and thermally decomposing a carbonyl of the magnetic-metal in the presence of the magnetic-field whereby uniformly acicular particles of the magnetic-metal result.

8. The process of forming high purity iron particles having a desired length to diameter ratio which process comprises the simultaneous steps of producing within a reaction zone a substantial and controllable magnetic field having a strength proportional to the desired length to diameter ratio and thermally decomposing an iron carbonyl in the presence of the magnetic field whereby uniformly acicular iron particles of high purity result.

9. The process of forming acicular particles of a magnetic-metal alloy and having a desired length to diameter ratio which process comprises the simultaneous steps of producing within a reaction zone a substantial and controllable magnetic field having a strength proportional to the desired length to diameter ratio and thermally decomposing in the presence of the magnetic field a mixture of carbonyls of the metals of the alloy including at least one magnetic-metal carbonyl whereby uniformly acicular particles of the magnetic-metal alloy result.

References Cited in the file of this patent

UNITED STATES PATENTS

| | | |
|---|---|---|
| 1,840,286 | Hochheim | Jan. 5, 1932 |
| 2,041,480 | Oexmann | May 19, 1936 |
| 2,188,091 | Baermann | Jan. 23, 1940 |
| 2,318,011 | Parsons et al. | May 4, 1943 |

FOREIGN PATENTS

| | | |
|---|---|---|
| 158,672 | Australia | Aug. 16, 1951 |
| 486,949 | Canada | Sept. 30, 1952 |

OTHER REFERENCES

Electrical Engineering, Kopelman, May 1952, pages 447–450.